United States Patent [19]

Nambu et al.

[11] 3,947,560

[45] Mar. 30, 1976

[54] PROCESS FOR OXIDIZING SULFUR DIOXIDE

[75] Inventors: Masao Nambu, Kawasaki; Syunichi Yamamoto; Hideo Machida, both of Yokohama, all of Japan

[73] Assignee: Nippon Oil Company, Ltd., Tokyo, Japan

[22] Filed: Mar. 5, 1974

[21] Appl. No.: 448,256

[30] Foreign Application Priority Data

Mar. 15, 1973  Japan............................. 48-29454
Mar. 15, 1973  Japan............................. 48-29455
Mar. 16, 1973  Japan............................. 48-29933

[52] U.S. Cl.............................. 423/522; 423/242
[51] Int. Cl.$^2$................... C01B 17/72; C01B 17/60
[58] Field of Search........... 423/522, 532, 533, 534, 423/535, 538, 242; 55/73; 252/471

[56] References Cited
UNITED STATES PATENTS

| | | | |
|---|---|---|---|
| 2,021,936 | 11/1935 | Johnstone | 423/242 |
| 2,090,142 | 8/1937 | Nonhebel et al. | 423/242 |
| 3,226,192 | 12/1965 | Atsukawa et al. | 423/242 |
| 3,318,662 | 5/1967 | Pauling | 423/522 |
| 3,710,548 | 1/1973 | Coughlin | 423/533 |
| 3,733,393 | 5/1973 | Couillaud et al. | 423/242 |
| 3,836,630 | 9/1974 | Noguchi et al. | 423/242 |

FOREIGN PATENTS OR APPLICATIONS

| | | | |
|---|---|---|---|
| 45-6688 | 3/1970 | Japan | 423/242 |
| 45-20481 | 7/1970 | Japan | 423/242 |

*Primary Examiner*—Oscar R. Vertiz
*Assistant Examiner*—Gary P. Straub
*Attorney, Agent, or Firm*—Sherman & Shalloway

[57] ABSTRACT

A process for oxidizing sulfur dioxide which comprises contacting a gas containing sulfur dioxide and a gas containing oxygen with an aqueous solution containing at least 3 ppm each of a pentavalent vanadium ion and a divalent manganese ion.

4 Claims, No Drawings

PROCESS FOR OXIDIZING SULFUR DIOXIDE

This invention relates to a process whereby a gas containing sulfur dioxide is treated to oxidize the sulfur dioxide to sulfuric acid in the liquid phase at a low temperature.

A method for air oxidizing sulfur dioxide using platinum, iron, copper, cobalt or vanadium as a catalyst, and in particular, the vanadium catalyst is in wide use in plants manufacturing sulfuric acid. However, these catalysts have poor activities at low temperatures, and therefore, require high temperatures of about 450° to 500°C. The equilibrium conversion of sulfur dioxide in this method is about 80 to 98% at most. It has already been clarified that such a low equilibrium conversion is due to the thermodynamic restrictions of the air oxidizing reaction at high temperatures. Thus, while the method for oxidizing sulfur dioxide using a vanadium catalyst is valuable for preparing concentrated sulfuric acid or fuming sulfuric acid using concentrated sulfurous acid gas as a material, it has the disadvantage that an unreacted gas containing sulfur dioxide in a concentration of as high as 1,500 to 4,000 ppm is generated. In order to increase the conversion of sulfur dioxide, it is necessary to perform the oxidation reaction at a temperature of not more than 400°C., preferably not more than 350° C. At such temperatures, all of the cobalt, copper, platinum, and vanadium have poor activities.

On the other hand, an attempt has been made to use an activated carbon catalyst for oxidizing sulfur dioxide at a low temperature of about 50°C. In this method, a greater part of the product (sulfuric acid) is firmly adsorbed to the activated carbon, and hampers the oxidation of sulfur dioxide. Accordingly, the activated carbon cannot be used for prolonged periods of time, and for example, activated carbon which has been used for half a day must be washed with water for a long time prior to using it repeatedly. Thus, such a method is quite unsuitable for practical application.

It has also been reported that an aqueous solution of ferrous sulfate, ferric chloride, manganese chloride, manganese nitrate or manganese nitrate or manganese sulfate can be used for low temperature oxidation of sulfur dioxide. It was also proposed a long time ago to use an aqueous solution containing both manganese sulfate and aluminum sulfate. These metal salt solutions, however, cause the formation and buildup of sulfuric acid in the reaction system (catalyst solution) and impede the oxidation reaction. The oxidation reaction tends to become somewhat slow even when the concentration of sulfuric acid built up in the reaction system becomes 1 to 2% by weight, and when the sulfuric acid concentration exceeds 8% by weight, it is difficult to oxidize sulfur dioxide rapidly.

We have made extensive studies with a view to finding a method whereby sulfuric acid is obtained from a gas containing sulfur dioxide and the concentration of sulfur dioxide in the unreacted discharged gas to not more than 5 to 100 ppm, and succeeded in using a vanadium catalyst, which has previously been used at high temperatures of about 450 to 500°C., as a catalyst for air oxidation in the liquid phase at a temperature as low as about 50°C.

According to this invention, there is provided a process for oxidizing sulfur dioxide, which comprises contacting a sulfur dioxide-containing gas and an oxygen-containing gas with an aqueous solution containing a pentavalent vanadium ion and a divalent manganese ion each in a concentration of at least 3 ppm.

In spite of using vanadium as one ingredient of the catalyst, the process of this invention makes it possible to oxidize sulfur dioxide in air at a temperature of not more than 350°C., especially at a temperature as low as about 50°C., easily and rapidly. Therefore, the oxidation reaction in accordance with this invention is not thermodynamically restricted as to the equilibrium conversion as is the case with the conventional vanadium catalyst, but it is possible to convert substantially all of the sulfur dioxide dissolved in the catalyst solution to sulfuric acid, and to reduce the concentration of the residual sulfur dioxide in the catalyst solution to not more than 1 to 2 ppm. Naturally, the concentration of residual sulfur dioxide in the unreacted gas which is discharged through the catalyst solution is very low, and can be easily reduced to not more than 5 to 100 ppm.

Even when sulfuric acid is generated and built up in the reaction system (catalyst solution) in a concentration of 1 to 20% by weight, and even 30% by weight, the oxidation reaction rapidly proceeds substantially independently of this phenomenon. Furthermore, no trouble occurs in the present invention which is ascribable to the firm adsorption of the product to the catalyst as is the case with the activated carbon catalyst.

The process of this invention can be applied to flue gases resulting from the burning of sulfur, hydrogen sulfide, heavy oil, coal, or tail gases from the sulfuric acid manufacturing equipment, roaster gases in steel, and exhaust gases from the sulfuric acid or paper-making plants. The process of this invention is valuable for practical application in that a gas containing sulfur dioxide can be desulfurized to reduce the concentration of the residual sulfur dioxide to not more than 5 to 100 ppm, and that sulfuric acid can be formed and built up in the catalyst solution (reaction system) to a concentration of 30 to 55% by weight.

The catalyst used in this invention is an aqueous solution containing a pentavalent vanadium ion and a divalent manganese ion, and the use of this composite catalyst system is of great significance. When pentavalent vanadium alone is used as a catalyst, there is no option but to employ a gaseous phase method at a temperature of at least 400°C. On the other hand, when the pentavalent vanadium is used in the form of an aqueous solution, the catalyst has relatively poor activity, and almost deactivated after oxidizing 3 to 5 mols of sulfur dioxide per atom of the vanadium. Thus, it cannot be a feasible catalyst. It has been thought previously that pentavalent vanadium cannot be used in the liquid phase, and high temperatures of above 400°C. are required in the gaseous phase. It is surprising that in the present invention, the composite catalyst system of a pentavalent vanadium ion and a divalent manganese ion as a catalyst makes it possible to convert sulfur dioxide in the liquid phase at a low temperature in a very high convertion.

An aqueous solution of divalent manganese can easily cause the air oxidation of sulfur dioxide. However, with the formation and buildup of sulfuric acid, its activity is drastically reduced. Moreover, the catalyst is poisoned by impurities deposited in the reaction system, such as powdery copper oxide, copper, copper sulfate, or phenol.

The following examples illustrate the fact that conventional catalysts for oxidizing sulfur dioxide are not satisfactory.

A. Sulfur dioxide was dissolved to a concentration of 1200 ppm (weight) in 1 liter of an aqueous solution containing 0.1% by weight of ammonium metavanadate (pentavalent vanadium salt) and 6% by weight of sulfuric acid, and the solution was transferred to a batchwise catalyst activity tester (a container with a stopper having an inner capacity of 5 liters) and shaken at room temperature in air. Oxidation of sulfur dioxide occurred slowly, and in 20 minutes, the concentration of the residual sulfur dioxide was reduced to 2 ppm. Sulfur dioxide was again dissolved in this aqueous solution to a concentration of 1000 ppm, and the same activity test was performed. The oxidation reaction proceeded more slowly, and even after a lapse of 40 minutes, sulfur dioxide remained in a concentration of 300 ppm. This means that when a vanadium catalyst is used in the form of aqueous solution, its catalytic activity is remarkably reduced by repetitive use.

B. Sulfur dioxide was dissolved to a concentration of 1000 ppm in 1 liter of a 0.1% by weight aqueous solution of manganese sulfate. The solution was transferred to a catalytic activity tester of the type set forth in (A) above, and shaken for 4 minutes in air, whereupon the concentration of sulfur dioxide in the aqueous solution decreased to 2 ppm. When, however, sulfur dioxide was dissolved to a concentration of 980 ppm in 1 liter of an aqueous solution containing 0.14% by weight of manganese sulfate and 10% by weight of sulfuric acid and the solution was shaken for 4 minutes in air in the same way as above, the concentration of the residual sulfur dioxide reached as high as 150 ppm. This means that the activity of a manganese catalyst is markedly reduced in the presence of sulfuric acid.

Furthermore, when sulfur dioxide was dissolved in a concentration of 950 ppm in 1 liter of an aqueous solution containing 0.13% by weight of manganese sulfate and 70 ppm of copper sulfate and the solution was shaken for 4 minutes in air, the concentration of the residual sulfur dioxide was 100 ppm, and did not decrease to 5 ppm until the solution was further shaken for 4 minutes.

If in the above experiment, the concentration of copper sulfate was increased to 240 ppm, the reaction became slower, and even after shaking for 10 minutes, sulfur dioxide remained in a concentration of 240 ppm. This means that a manganese catalyst is markedly poisoned by copper sulfate.

Furthermore, when sulfur dioxide was dissolved to a concentration of 950 ppm in 1 liter of an aqueous solution containing 0.13% by weight of manganese sulfate and 70 ppm of phenol, the reaction proceeded slowly, and the concentration of residual sulfur dioxide decreased to 2 ppm only after shanking for 10 minutes. This means that the manganese catalyst is poisoned also by phenol.

C. An iron salt catalyst solution well known for over seventy years also decreases in catalytic activity as a result of the formation and buildup of sulfuric acid in the catalyst solution, and is also markedly poisoned by impurities such as tin salts. Some examples are given below.

When sulfur dioxide was dissolved to a concentration of 1300 ppm in 1 liter of a 0.1% by weight aqueous solution of ferric chloride and the solution was shaken for 5 minutes in the same catalyst activity tester as in (A), the concentration of the residual sulfur dioxide was reduced to less than 2 ppm.

However, when sulfur dioxide was dissolved to a concentration of 1300 ppm in 1 liter of an aqueous solution containing 0.1% by weight of ferric chloride and 6% by weight of sulfuric acid, and shaken for 5 minutes in the same way, the concentration of sulfur dioxide did not substantially decrease. Even after further shaking for 6 minutes, sulfur dioxide remained in a concentration of 430 ppm.

When in the above experiment, the concentration of the ferric chloride was increased to four times, and the reaction temperature was raised to 50°C., sulfur dioxide remained in a concentration of 280 ppm even after shaking for 10 minutes. This means that an iron catalyst markedly decreases in catalytic activity in the presence of sulfuric acid.

Furthermore, when in the above experiment, the reaction was carried out for 10 minutes at 50°C. using 0.4% by weight of ferrous sulfate instead of the ferric chloride, the sulfur dioxide remained in a concentration of 300 ppm.

When sulfur dioxide was dissolved to a concentration of 1300 ppm in 1 liter of an aqueous solution containing 0.1% by weight of ferric chloride and 2800 ppm of stannic chloride and the solution was shaken for 7 minutes in the same way as in (A) above, sulfur dioxide remained in a concentration of 400 ppm. This means that the iron catalyst is poisoned by tin (tetravalent).

D. A composite catalyst solution comprising a manganese salt and an aluminum salt has already been proposed. With this catalyst, the obstruction by the formation and buildup of sulfuric acid can be alleviated to some extent, but the reaction proceeds only slowly when the concentration of sulfuric acid is above 10% by weight. Especially when the sulfuric acid concentration is about 19% by weight, the reaction is extremely slow. The poisoning with a copper salt is also the same as in the case of using the manganese salt alone. Some examples are given below.

When sulfur dioxide was dissolved to a concentration of 1000 ppm in 1 liter of aqueous solution of 3000 ppm of manganese sulfate, 6500 ppm of aluminum sulfate, and 11% by weight of sulfuric acid, and the solution was shaken for 5 minutes at 50° C., the sulfur dioxide remained in a concentration of 110 ppm.

When sulfur dioxide was dissolved to a concentration of 300 ppm in 1 liter of an aqueous solution containing 5500 ppm of manganese sulfate, 12000 ppm of aluminum sulfate and 19% by weight of sulfuric acid, and the solution was shaken at room temperature for 7 minutes, the sulfur dioxide remained in a concentration of 150 ppm.

From these experiments, it is seen that the activity of the manganese/aluminum catalyst is poor in the presence of sulfuric acid.

When sulfur dioxide was dissolved to a concentration of 1000 ppm in 1 liter of an aqueous solution containing 3000 ppm of manganese sulfate, 6500 ppm of aluminum sulfate and 500 ppm of copper sulfate, and the solution was shaken for 10 minutes at 50°C., the sulfur dioxide remained in a concentration of 300 ppm. This means that a manganese/aluminum catalyst is also poisoned with copper sulfate.

As illustrated above, all of the known conventional oxidizing catalysts, such as the pentavalent vanadium salt, iron salt, divalent manganese salt, or divalent manganese salt/aluminum salt composite, have serious defects against practical application. These defects can be remedied completely by the present invention, which has provided the unexpected result that when an aqueous solution (or dilute sulfuric acid solution) containing a pentavalent vanadium ion and a divalent manganese ion in a concentration of at least 3 ppm respectively is used as a catalyst for oxidizing sulfur dioxide, all of the difficulties of the conventional catalysts as illustrated in (A) to (D) above can be overcome.

It is essential in the process of the invention that the vanadium ion be pentavalent in the catalst solution. Lower valency (di- to tetravalent) vanadium ions, even when combined with a great quantity of divalent manganese ion, do not exhibit any catalytic activity. Desirably, the aqueous catalyst solution used in the process of this invention contains at least 3 ppm of each of the pentavalent vanadium ion and the divalent manganese ion. There is an appreciable catalytic activity even when the concentration of the pentavalent vanadium ion or the divalent manganese ion is less than 3 ppm. But it is undesirable because the reaction proceeds relatively slowly. There is no particular upper limit to the concentration of each of these two ions, but sufficient catalytic activity can be obtained when the concentration of the pentavalent vanadium ion is 8000 ppm, and that of the divalent manganese ion is 200 ppm. Since higher concentrations of these ions do not bring about any substantial increase in the activity of the catalyst solution, it is preferred that the concentration of the pentavalent vanadium ion be 3 to 8000 ppm, and that of the divalent manganese ion be 3 to 200 ppm. Especially preferably, the concentration of the pentavalent vanadium ion is 10 to 8000 ppm, and the concentration of the divalent manganese ion is 5 to 200 ppm.

The oxidation of sulfur dioxide in accordance with this invention can be performed at a temperature of 0° to 100°C. The reaction is especially rapid when the temperature is 20° to 70°C. The reaction can be performed at a temperature lower than 20°C., but proceeds relatively slowly. The reaction can of course be performed at a temperature higher than 70°C., or above 100°C. at an elevated pressure, but no appreciable difference in the rate of reaction is seen as compared with the case of performing the reaction at 20° to 70°C.

The oxidation of sulfur dioxide can be carried out by contacting a gas containing sulfur dioxide with a catalyst solution, and then contacting the resulting solution with air or other suitable gas containing oxygen. Alternatively, a gas containing both sulfur dioxide and oxygen can be brought into contact with the catalyst solution. The resulting sulfuric acid is dissolved and built up in the catalyst solution, but the catalyst solution maintains its activity until the concentration of sulfuric acid therein reaches 55% by weight. Especially when the concentration of sulfuric acid is 0 to 30% by weight, the oxidation reaction proceeds very rapidly. Accordingly, the catalyst solution can be repeatedly used until the concentration of sulfuric acid reaches 30 to 55% by weight. It is possible however to stop using the catalyst solution repeatedly before the concentration of sulfuric acid exceeds 30% by weight. The resulting sulfuric acid contains the vanadium salt and the manganese salt used for preparing the catalyst solution, and impurities ascribable to the gas containing sulfur dioxide. The sulfuric acid can be used directly as industrial grade dilute sulfuric acid. Alternatively, a calcium compound is added to the dilute sulfuric acid to neutralize the sulfuric acid, and the resulting gypsum is separated, after which the catalyst solution is recovered and repeatedly used for the oxidation of sulfur dioxide.

One method for preparing the catalyst solution to be used in the process of this invention comprises adding a substance yielding a pentavalent vanadium ion and a substance yielding a divalent manganese ion to acidic, neutral or alkaline water. The resulting catalyst solution is usually in the suspended state when the solution is alkaline, and in the partially suspended state when the solution is neutral or acidic. In either case, the solution turns into a substantially clear homogeneous solution as soon as it is used for the oxidation reaction of sulfur dioxide, and therefore, no trouble occurs in practice.

Examples of the substance yielding the pentavalent vanadium ion include oxides of vanadium, such as vanadium pentoxide, vanadium pentafluoride, vanadyl trifluoride, vanadyl trichloride, vanadyl tribromide, ammonium metavanadate, vanadinite, ammonium pervanadate, or sodium orthovanadate, and pentavalent vanadium salts such as the halides, oxyhalides, metavanadates, polyvanadates, or vanadium ore. There can also be used oxidation products of vanadium salts or metal vanadium having an atomic valency lower than pentavalent, such as an oxide, halide or oxyhalide of tetravalent vanadium such as vanadium dioxide, vanadium tetrafluoride, vanadium tetrachloride, vanadium tetrabromide, vanadyl difluoride, vanadyl dichloride, vanadyl dibromide, vanadyl sulfate, or acidic vanadyl sulfate, an oxide, halide, or oxyhalide of trivalent vanadium, such as a vanadite, an oxysulfate, vanadium trioxide, vanadium trifluoride, vanadium trichloride, vanadium tribromide, vanadyl monochloride, vanadyl monobromide or vanadic sulfate, an oxide, halide, sulfate or hydroxide of divalent vanadium such as a sulfate, vanadium monoxide, vanadium dichloride, vanadium dibromide, vanadium sulfate, or vanadium hydroxide, or metallic vanadium. The oxidation is carried out electrolytically, or using a known oxidizing agent such as potassium permanganate, potassium bichromate, cerium sulfate, nitric acid, sulfuric acid, chlorine, air, or ammonium persulfate. In another embodiment, these lower valency vanadium sources are dissolved in the catalyst solution, and then oxidized to a pentavalent vanadium ion.

On the other hand, typical examples of the substance yielding the divalent manganese ion are manganese sulfate, manganese chloride, manganese fluoride, manganese nitrate, manganese lactate, manganese acetate, manganese benzoate, manganese formate, manganese dithionate, manganese dihydrogen phosphate, or manganese hypophosphite, all of which yield a divalent manganese salt upon being dissolved in water.

When an iodine ion is present in the reaction system, the reaction tends to be retarded. Thus, the use of manganese iodide is not preferred in spite of the fact that it yields a divalent manganese ion in water. On the other hand, substances which yield a divalent manganese ion upon being dissolved in sulfuric acid or sulfurous acid can be conveniently used in the process of this invention since sulfuric acid or sulfurous acid is present in the reaction system. Examples of such substances are manganese hypophosphite, manganese pyrophosphate, manganese monoxide, manganese sulfide, manganese sulfite, manganic phosphate, manganese borate, and metallic manganese. High valency manganese salts such as manganese dioxide, potassium permanganate, potassium manganate, or manganic sulfate can also be used as substances yielding a divalent manganese ion in the process of this invention because they yield a divalent manganese ion by reaction with sulfurous acid (sulfur dioxide).

The catalyst solution used in the process of this invention is a neutral or acidic aqueous solution or suspension containing both a pentavalent vanadium ion and a divalent manganese ion and having a sulfuric acid concentration of not more than 55% by weight. Even when the catalyst solution as prepared is alkaline, it can be effectively used in the process of this invention because it easily turns acidic when used for oxidizing sulfur dioxide.

One very preferred embodiment of preparing the catalyst solution used in the process of this invention involves mixing the soot and/or combustion residue obtained by the combustion of a fuel oil containing a distillation residual oil, with an aqueous treating liquid thereby to form an aqueous mixed solution containing a pentavalent vanadium ion and a divalent manganese ion each in a concentration of at least 3 ppm.

The term "distillation residual oil", as used herein, denotes crude petroleum, naturally occurring tar, shale oil, tar sand, tar, or the residue of such oil resulting from the separation of a part or whole of volatile fractions by distillation or other means (for example, atmospheric residual oils resulting from distillation at atmospheric pressure, residual oils resulting from distillation at atmospheric pressure, residual oils resulting from distillation at reduced pressure, or asphalt). This oil usually contains a substantial amount of asphaltene, and therefore, usually contains vanadium and manganese.

The term "soot obtained by the combustion of a fuel oil", as used herein, (which may often be abbreviated to soot), denotes the substance collected by a dust collector from the upper part of a flue after the combustion of the fuel oil. Furthermore, the term "combustion residue obtained by the combustion of a fuel oil", as used herein, (which may often be abbreviated to combustion residue), denotes the substance which is formed by the combustion of the fuel oil and collected from the bottom of an oven or flue (usually, no dust collector is used for collecting the combustion residue).

The term "aqueous treating liquid", as used herein, denotes an inorganic or organic aqueous medium which can act as an extracting solvent for vanadium and manganese contained in a mixture of it with the soot and/or combustion residue, and can dissolve the pentavalent vanadium ion and the divalent manganese ion each in a concentration of at least 3 ppm. The "aqueous treating liquid" may be water alone, or an aqueous solution of, for example, sodium hydroxide, potassium hydroxide, sulfuric acid, nitric acid, sulfurous acid, hydrochloric acid, ammonium chloride, or an alcohol used either alone or in combination. In view of the fact that the catalyst solution to be used in this invention serves to convert sulfur dioxide in aqueous medium to sulfuric acid, water or dilute sulfuric acid is most preferred as the aqueous treating liquid. Alkaline aqueous solutions having a pH of at least 7.6 are not particularly advantageous because of their relatively poor ability to extract the manganese salt. However, they can be used as an extracting agent if a proper measure (for example, the addition of the manganese salt) is taken.

It is sufficient that the temperature at which the soot and/or combustion residue is mixed with the aqueous treating liquid is room temperature. At a temperature of 40° to 100°C., the extraction can be more rapidly carried out to extract the pentavalent vanadium and the divalent manganese contained therein, and in many cases, the concentration each of the pentavalent vanadium ion and the divalent manganese ion in the extract becomes at least 3 ppm. Preferably, this extract is filtered, and this filtration gives a clear aqueous solution or a semi-transparent colloidal suspension, which can be directly used as a catalyst solution for oxidizing sulfur dioxide. In some cases, the concentration of either one or both of the pentavalent vanadium and the divalent manganese becomes below 3 ppm. Or even when the concentrations of both are higher than 3 ppm, it is sometimes desirable to increase the concentration of one of them. In such cases, at least one of the following procedures is applied to the aqueous solution obtained by the extraction thereby to increase the concentration of the pentavalent vanadium ion and/or the divalent manganese ion to the desired value.

1. To concentrate the aqueous solution.
2. To add a vanadium compound or metallic vanadium to the solution.
3. To add a manganese compound or metallic manganese to the aqueous solution.
4. To oxidize a lower valency vanadium ion in the aqueous solution to a pentavalent vanadium ion.

By the above extracting procedure using water or dilute sulfuric acid, a greater part (for example, about 50 to 97%) of vanadium in the soot or combustion residue can be easily extracted. Since a greater part of the vanadium ion in the extract is usually tetravalent, a part or whole of the lower valency vanadium is preferably converted to pentavalent vanadium by a suitable oxidizing method. Alternatively, the concentration of the pentavalent vanadium ion can be elevated to the desired value by adding a pentavalent vanadium salt directly to the extract, or adding a divalent to tetravalent vanadium salt or metallic vanadium to the extract and then oxidizing it to a pentavalent vanadium ion. This can be readily understood from the above description.

The manganese content of the soot or combustion residue is generally low compared with vanadium, and in many cases, it contains for example about 1% by weight of vanadium, whereas the content of manganese is about 1/10 to 1/30 of the vanadium content. However, since the catalyst of this invention requires only a relatively small amount of manganese, it is often sufficient to use a divalent manganese ion extracted from the soot or combustion residue. Sometimes, where the soot or combustion residue having an especially low manganese content is utilized or the efficiency of extracting manganese is low, the concentration of the divalent manganese ion does not reach the desired value. In such cases, a required amount of the substance yielding a divalent manganese ion is additionally supplied to increase the divalent manganese ion concentration to the desired value, as stated above.

The catalyst solution obtained by mixing soot and/or combustion residue with the aqueous treating liquid contains some amounts of a variety of metal salts such as salts of nickel, iron, silicon, aluminum, copper, lead, calcium, zinc, magnesium, sodium, phosphorus, molybdenum, tungsten, potassium, titanium, boron, barium, cobalt, strontium, chromium, antimony, arsenic, cadmium, bismuth, or beryllium, in addition to vanadium and manganese, but these metal salts do not disturb the process of this invention.

The method for preparing the catalyst solution from the combustion residue or soot resulting from the combustion of a vanadium-containing fuel has the advantage that industrial wastes are utilized effectively.

The fuel oil containing the distillation residual oil used in the invention is preferably a petroleum-type heavy fuel oil (crude, oil, heavy oil, or asphalt) because it generates soots and combustion residues having a relatively high vanadium content, and therefore, vanadium can be extracted economically therefrom.

Another very preferred embodiment of the method for preparing the catalyst solution used in the process of this invention involves using manganese dioxide as a catalyst for converting tetravalent vanadium present in the above-mentioned soot and combustion residue to pentavalent vanadium.

Manganese dioxide is water-insoluble and sparingly soluble in dilute sulfuric acid. Accordingly, the use of manganese dioxide as an oxidizing agent requires the use of a hydrochloric acid solvent, and does not exhibit its effect in water or dilute sulfuric acid, as has been previously considered. We have however found that when manganese dioxide is added to an aqueous solution containing tetravalent vanadium, the tetravalent vanadium is rapidly converted to pentavalent vanadium in spite of the fact that the manganese dioxide is indeed insoluble in water. This phenomenon is always observed also when the concentration of sulfuric acid in this aqueous solution is 0 to 30% by weight, or 30 to 98% by weight. The effect of manganese dioxide can be similarly obtained on the extract of soot and combustion residue. The manganese dioxide to be used can be purified manganese dioxide as well as crude manganese ores. The manganese dioxide added can lead to the conversion of 2 times its mole of tetravalent vanadium to pentavalent vanadium.

With the addition of manganese dioxide, the oxidation of the tetravalent vanadium immediately begins even at room temperature. A total amount of the tetravalent vanadium can be oxidized to pentavalent vanadium by adding powdery manganese dioxide to the extract in an amount corresponding to two times the stoichiometrical amount of the tetravalent vanadium in the extract, and stirring the mixture for 5 to 6 seconds. Or by adding a stoichiometrical, or slightly smaller, amount of manganese dioxide to the extract, and stirring the mixture at room temperature for 1 hour, at least 90% of the tetravalent vanadium corresponding to the amount of the manganese dioxide added can be converted to pentavalent vanadium. In this case, even when the mixture is allowed to stand for 10 hours at room temperature, the conversion of at least 90% can be attained. The time required to treat the extract with manganese dioxide varies according to the amount and particle diameter of manganese dioxide added, and the state of stirring, but in any case, a greater part of tetravalent vanadium can be oxidized easily to pentavalent vanadium.

The application of this oxidizing method using manganese oxide to the catalyst solution obtained by mixing the soot and/or combustion residue with the aqueous treating liquid is the most preferred embodiment of preparing the catalyst solution for use in this invention. The catalyst solution obtained by the above mixing treatment and then filtering the mixture usually contains 5 to 4000 ppm, as metal, of the vanadium component, and most of the vanadium component is present in the tetravalent state. By adding at least 5 ppm of manganese dioxide to this catalyst solution, a catalyst solution suitable for use in this invention can be obtained. When unreacted manganese dioxide is left after this treatment, it can be recovered by collecting the supernatant liquid or by filtering the extract. But it is not altogether necessary to recover the unreacted manganese dioxide.

We have cited hereinabove the electrolytic oxidizing method and the oxidizing treatment using potassium permanganate, cerium sulfate, potassium bichromate, chlorine, nitric acid, or sulfuric acid, but the oxidizing method using manganese dioxide is superior to all the other methods from the viewpoint of economic advantage. The economic advantage is that there is no need to use cerium sulfate, potassium persulfate, potassium bichromate, and chlorine which are expensive oxidizing agents nor to rely on the electrolytic oxidizing method or the uneconomical oxidizing method using, for example, concentrated sulfuric acid or concentrated nitric acid, but that crude manganese ores such as pyrolusite can be directly used.

Furthermore, the above process has the advantage that manganese dioxide used to convert tetravalent vanadium to pentavalent vanadium can act as a catalyst component together with pentavalent vanadium immediately, because manganese dioxide is converted to divalent manganese (manganese sulfate) as a result of functioning as an oxidizing agent for the tetravalent vanadium.

Furthermore, even when the extract of soot and/or combustion residue contains a sufficient amount of tetravalent vanadium but scarcely any manganese, the oxidation of the extract with manganese dioxide can immediately bring about a useful catalyst.

The following Examples illustrate the present invention in greater detail.

EXAMPLE 1

Manganese sulfate (3000 ppm, calculated as anhydride) and ammonium metavanadate (100 ppm) were added to 1 liter of 6% by weight sulfuric acid having dissolved 1300 ppm of sulfur dioxide therein. The mixture was placed in a batchwise catalytic activity tester (a container with a stopcock having an inner capacity of 20 liters), and shaken for 2 minutes at room temperature. The concentration of sulfur dioxide in the reaction decreased to 2 ppm.

EXAMPLE 2

Manganese nitrate (3000 ppm calculated as anhydride) and ammonium metavanadate (2500 ppm) were added to an aqueous solution containing 1280 ppm of sulfur dioxide (pH 1.9), and the mixture was tested in the same manner as in Example 2. It was found that after shaking for 20 seconds, the concentration of sulfur dioxide decreased to half. After shaking for an additional 90 seconds, the concentration of the residual sulfur dioxide reached 2 ppm. Sulfuric acid was formed in a corresponding amount (1950 ppm).

EXAMPLE 3

Manganese sulfate (150 ppm calculated as anhydride) and ammonium metavanadate (10000 ppm) were added to 8% by weight sulfuric acid having dissolved therein 570 ppm of sulfur dioxide, and then the mixture was tested in the same way as in Example 1. After shaking for 30 seconds, the concentration of sulfur dioxide decreased to 4 ppm. After another 10 seconds, the concentration of residual sulfur dioxide decreased to below 2 ppm.

EXAMPLE 4

Manganese chloride (150 ppm calculated as anhydride) and ammonium metavanadate (2000 ppm) were added to 33% by weight sulfuric acid containing 450 ppm of sulfur dioxide dissolved therein, and the mixture was tested in the same way as in Example 1. The concentration of sulfur dioxide decreased to half after 30 seconds, and after another 1 minute, the concentration of the sulfur dioxide was reduced to below 2 ppm.

EXAMPLE 5

Manganese sulfate (8 ppm calculated as anhydride) and ammonium metavanadate (1,500 ppm) were added to 14% by weight sulfuric acid containing 440 ppm of sulfur dioxide dissolved therein, and the mixture was tested in the same way as in Example 1. After shaking for 3 minutes, the concentration of sulfur dioxide decreased to below 2 ppm.

EXAMPLE 6

Manganese sulfate (150 ppm calculated as anhydride) (1 mM/$l$) and ammonium metavanadate (23 ppm) (0.2 mM/$l$) were added to 8% by weight sulfuric acid containing 450 ppm (7mM/$l$) of sulfur dioxide dissolved therein, and the mixture was tested in the same way as in Example 1. After shaking for 2 minutes, the concentration of sulfur dioxide decreased to below 2 ppm.

EXAMPLE 7

To an aqueous solution containing 1300 ppm of sulfur dioxide dissolved therein were added powdery vanadium pentoxide (1300 ppm) and powdery manganese dioxide (1000 ppm). The resulting suspension was shaken in the same way as in Example 1. After a lapse of 1 minute, 60% of sulfur dioxide was converted to sulfuric acid, and after another 1 minute, 87% of sulfur dioxide was converted to sulfuric acid. After another 30 seconds, all of the sulfur dioxide was converted to sulfuric acid.

EXAMPLE 8

Manganese sulfate (1500 ppm calculated as anhydride) and 360 ppm of vanadium pentoxide were added to an aqueous solution containing 780 ppm of sulfur dioxide, 2000 ppm (calculated as anhydride) of copper sulfate and 4% by weight of sulfuric acid. The resulting suspension was tested in the same way as in Example 1. It was found that after shaking for 90 seconds, the concentration of residual sulfur dioxide decreased to below 2 ppm.

EXAMPLE 9

Conc. aqueous sulfurous acid (5% by weight) was added in an amount of 1.4% by volume to 4% by weight sulfuric acid containing vanadium pentoxide (200 ppm) and manganese sulfate (300 ppm), and the resulting mixture was shaken in the same way as in Example 1. It was found that after 1 minute, the catalyst solution (reaction system) was a substantially clear, and after another 2 minutes, the concentration of sulfur dioxide decreased to below 2 ppm.

EXAMPLE 10

A gaseous mixture consisting of 2500 ppm of sulfur dioxide, 5% of oxygen, 11% by volume of carbon dioxide, 10% by weight of moisture and the remainder being nitrogen and maintained at 200°C. was fed to the bottom of an absorption tower 56 cm in inside diameter and 6 m in height packed with Raschig rings at a rate of 1190 N m$^3$/hr. An aqueous solution containing 300 ppm (calculated as anhydride) of manganese sulfate, 2300 ppm of vanadium pentoxide and 10% by weight of sulfuric acid and maintained at 20°C. was fed into the absorption tower at a rate of 30$^3$m/hr. from its top. From the bottom of the tower, an absorbing liquid containing 270 ppm of sulfur dioxide was discharged.

The absorbing liquid was fed into the bottom of an oxidizing tower having an inside diameter of 70 cm and a height of 2 m and including 5 porous trays at a rate of 30 m$^3$/hr, and also air was fed into it at a rate of 20 m$^3$/hr. The effluent from the top of the oxidizing tower was recycled as a sulfur dioxide absorbing liquid to be fed to the top of the absorption tower. The unreacted air exhausted from the top of the oxidizing tower was combined with the feed gas to be supplied to the bottom of the absorption tower. The sulfur dioxide-containing gas was continuously desulfurized by a series of the above operations. It was found that the concentration of sulfur dioxide in the desulfurized gas exhausted from the absorption tower decreased to 90 ppm.

On the fourth day, the concentration of sulfuric acid in the recycle liquid reached 13% by weight, and on the fifth day, it rose to 14% by weight. However, the concentration of sulfur dioxide in the desulfurized gas was maintained at 90 to 100 ppm.

EXAMPLE 11

A residual oil [yield 56.5% by volume, specific gravity (20/4) 0.900, viscosity (50°C.) 250 cst, pour point 50°C., sulfur 0.15% by weight, nitrogen 0.10% by weight, vanadium 3 ppm, and nickel content 30 ppm] resulting from the distillation at atmospheric pressure of crude oil [occurring in Sumatra, specific gravity (20/4) 0.848, viscosity (50°C.) 10 cst, sulfur 0.10% by weight, nitrogen 0.05% by weight, vanadium 2 ppm, nickel 13 ppm] was burned. 2600 g (about 7 liters) of the combustion residue (carbon 86.7% by weight, vanadium 0.99% by weight, manganese 0.03% by weight, copper 0.01% by weight, lead 0.018% by weight, and further containing at least nickel, iron, silicon, magnesium, aluminum, calcium, sodium, titanium, and arsenic) remaining in the combustion furnace was collected, and immersed in 6 liters (6400 g) of 10% by weight of sulfuric acid at room temperature for 6 hours. It was then filtered to separate a green semitransparent filtrate (tetravalent vanadium 3500 ppm, iron 7400 ppm, nickel 3000 ppm, manganese 70 ppm, aluminum 20 ppm, silicon 12 ppm, lead 5 ppm, copper 11 ppm). The presence of pentavalent vanadium was scarcely observed (less than 3 ppm). Potassium permanganate (1.95 g) was added to 1 liter of this filtrate thereby to form a catalyst solution containing 3500 ppm of pentavalent vanadium, 675 ppm of divalent manganese, and 10% by weight of sulfuric acid.

Sulfur dioxide was dissolved in 1 liter of this catalyst solution to a concentration of 1550 ppm, and then shaken for 90 seconds in air at room temperature using a batchwise catalytic activity tester (a container with a stopcock with a capacity of 5 liters). The concentration of sulfur dioxide in the catalyst solution decreased to below 2 ppm.

EXAMPLE 12

The catalyst solution prepared in Example 11 was diluted to form an aqueous solution containing 1750 ppm of pentavalent vanadium, 340 ppm of manganese and 5% by weight of sulfuric acid. Sulfur dioxide was dissolved in 1 liter of this aqueous solution to a concentration of 1580 ppm. The same activity test as in Example 11 was performed, and it was found that after 90 seconds, the concentration of sulfur dioxide decreased to 2 ppm. After a series of the above steps, sulfur dioxide was again dissolved in this catalyst solution to a concentration of 1540 ppm. After performing the same test for 90 seconds, the concentration of sulfur dioxide in the catalyst solution decreased to 2 ppm. The above procedure was repeated 7 times, and it was found that by 90 second-shaking each time, the concentration of sulfur dioxide was always decreased to 2 ppm.

EXAMPLE 13

A bottom fraction [yield based on crude oil 24.7 vol %, specific gravity (20/4) 0.937, viscosity (98.9°C.) 125 cst, sulfur 0.18%, nitrogen 0.2%, vanadium 5 ppm, nickel 50 ppm] resulting from the distillation at reduced pressure of crude oil (occurring in Sumatra) was burned, and 5050 g of the combustion residue (carbon 86.5% by weight, vanadium 3000 ppm, lead 100 ppm, manganese 200 ppm, copper 100 ppm) was immersed in 20 liters of water for 2 days to form a green non-transparent aqueous solution (tetravalent vanadium 410 ppm, pentavalent vanadium 205 ppm, nickel 120 ppm, iron 430 ppm, silicon 10 ppm, aluminium 4 ppm, manganese 2.5 ppm). To 1 liter of this aqueous solution was added 0.15 g (calculated as anhydride) of manganese sulfate to form a catalyst solution containing 200 ppm of pentavalent vanadium and 60 ppm of divalent manganese.

Sulfur dioxide was dissolved in this catalyst solution to a concentration of 350 ppm, and the solution was subjected to the shaking test for 90 seconds at room temperature. It was found that the concentration of sulfur dioxide decreased to below 2 ppm.

EXAMPLE 14

2300 g of soot (carbon 91% by weight, vanadium 3%, nickel 1.2%, iron 0.5%, manganese 0.26%) generated as a result of burning crude oil [occurring in Arabia, specific gravity (20/4) 0.851, sulfur 1.7%, nitrogen 0.09%, vanadium 13 ppm, nickel 4 ppm] was collected, and immersed in 8 liters of hot water at 70°C. for 1 hour, followed by filtration. Furthermore, the soot was washed with 7 liters of water, and filtered. The two filtrates were combined, and sulfur dioxide was dissolved to a concentration of 530 ppm in 1 liter of the combined filtrates (pentavalent vanadium 180 ppm, tetravalent vanadium 3500 ppm, nickel 920 ppm, iron 380 ppm, manganese 164 ppm, copper 110 ppm), and the solution was subjected to an activity test in the same way as in Example 11. It was found that after 2 minutes, the concentration of sulfur dioxide decreased to 2 ppm.

EXAMPLE 15

2600 g of a combustion residue (carbon 86%, moisture 1%, vanadium 3%, iron 0.4%, nickel 0.8%, copper 360 ppm) of a bottom oil [yield based on crude oil 34% by volume, specific gravity (20/4) 0.99, pour point 32°C., residual carbon 18%, average molecular weight 890, carbon 83.9%, hydrogen 10.4%, sulfur 4.9%, nitrogen 0.34%, penetration (25°C.) more than 300, vanadium 140 ppm, nickel 45 ppm, sodium 42 ppm] resulting from the distillation at reduced pressure of crude oil [occurring in Khafji, specific gravity (20/4) 0.88%, viscosity at 50°C. 12 cst, sulfur 3.0%, nitrogen 0.18%, vanadium 56 ppm, nickel 19 ppm] was collected, and immersed in 12 liters of 10% sulfuric acid for 2 hours, followed by filtration. Furthermore, the combustion residue was washed with 40 liters of water, and filtered. The two filtrates were combined, and 6.4 g of manganese monoxide was added to 1 liter of the combined filtrates (containing 3 ppm of pentavalent vanadium, 1300 ppm of tetravalent vanadium, 27 ppm of manganese, 304 ppm of nickel, 16 ppm of copper), and cerium sulfate was added in an amount of 10.5 g calculated as anhydride to form a catalyst solution containing 1300 ppm of pentavalent vanadium and 85 ppm of manganese. Sulfur dioxide was dissolved in this catalyst solution to a concentration of 1300 ppm, and the solution was subjected to an activity test in the same way as in Example 11. By shaking for 90 seconds, the concentration of sulfur dioxide of the catalyst solution was reduced to less than 2 ppm.

EXAMPLE 16

3 Kg of a combustion residue (carbon 89%, vanadium 3.2%, nickel 0.8%) of a bottom oil [yield based on crude oil 55.5% by volume, specific gravity (20/4) 0.985, viscosity (50°C.) 2000 cst, pour point 10°C., sulfur 4.1%, nitrogen 0.28%, n-heptane insoluble portion 6.9% by weight, vanadium 82 ppm, nickel 28 ppm] resulting from the distillation at atmospheric pressure of crude oil (occurring in Khafji, vanadium 64 ppm, nickel 19 ppm) was collected, and immersed in 18 liters of 20% sulfuric acid at 60°C. for 30 minutes, followed by filtration. It was further washed with 40 liters of water, and filtered. The two filtrates were combined, and 1.27 g of potassium bichromate was added to 1 liter of the combined filtrates (pentavalent vanadium 5 ppm, tetravalent vanadium 1274 ppm, manganese 31 ppm) until the oxidation-reduction equivalent point was reached. Furthermore, 0.09 g of manganese sulfate was added to form a catalyst solution containing 1280 ppm of pentavalent vanadium and 60 ppm of manganese.

Sulfur dioxide was dissolved in this solution to a concentration of 1430 ppm, and the solution was subjected to an activity test in the same way as in Example 11. It was found that after 90 seconds, the concentration of sulfur dioxide was decreased to below 2 ppm.

EXAMPLE 17

160 Kg (about 420 liters) of a combustion residue (carbon 86.8% by weight, vanadium 1% by weight, manganese 0.025% by weight, copper 0.01% by weight) of a residual oil [yield 56.5% by volume, specific gravity (20/4) 0.900, viscosity (50°C.) 250 cst, pour point 50°C., sulfur 0.15% by weight, nitrogen 0.10% by weight, vanadium 3 ppm, nickel 30 ppm] resulting from the distillation at atmospheric pressure of crude oil [occurring in Sumatra, specific gravity (20/4) 0.848, viscosity (50°C.) 10 cst, sulfur 0.10% by weight, nitrogen 0.05% by weight, vanadium 2 ppm, nickel 12 ppm] was immersed in 500 liters of water, and the filtrate was separated after 1 hour. 100 liters of this filtrate (containing 230 ppm of pentavalent vanadium, 2480 ppm of tetravalent vanadium, and 32 ppm of manganese) was collected, and 158 g of potassium permanganate was added to form a catalyst solution containing 2700 ppm of pentavalent vanadium and 580 ppm of manganese.

A gaseous mixture maintained at 200°C. and consisting of 2500 ppm of sulfur dioxide, 5% by volume of oxygen, 11% by volume of carbon dioxide and 9% by weight of moisture was fed to a packed tower (absorption tower) having an inside diameter of 2 inches and a height of 5 meters at a rate of 2N m³/hr, and at the same time, the above catalyst solution maintained at 20°C. was fed into the top of the tower at a rate of 100 liters/hr. An absorbing liquid containing 140 ppm of sulfur dioxide was discharged from the bottom of the tower. The absorbing liquid so discharged was fed to the bottom of a multi-tray oxidation tower having an inside diameter of 2 inches and a height of 60 cm at a rate of 100 liters/hr. Simultaneously, air was fed to it at a rate of 30 liters/hr. The effluent from the bottom of the oxidation tower was recycled as a sulfur dioxide absorbing liquid to be fed to the top of the absorption tower, and the unreacted air exhausted from the top of the oxidation tower was combined with the feed gas to be supplied to the bottom of the absorption tower. By a series of these steps, the above sulfur dioxide-containing gas was continuously desulfurized. It was found that the concentration of sulfur dioxide in the desulfurized gas exhausted from the absorption tower was 2 ppm initially, 34 ppm on the fourth day, and 90 to 100 ppm on the 10th day, But even at the 15th day, the concentration was still maintained at about 95 ppm. The sulfuric acid concentration of the recycle liquid (catalyst solution) was 2% by weight on the 4th day, 5% by weight on the 10th day and 11% by weight on the 20th day. However, the concentration of sulfur dioxide in the desulfurized gas was always maintained below 100 ppm.

EXAMPLE 18

A residual oil [yield 56.5% by volume, specific gravity (20/4) 0.900, viscosity (50°C.) 250 cst, pour point 50°C., sulfur 0.15% by weight, nitrogen 0.10% by weight, vanadium 3 ppm, nickel 30 ppm] resulting from the distillation at atmospheric pressure of crude oil [occurring in Sumatra, specific gravity (20/4) 0.848, viscosity at 50°C. 10 cst, sulfur 0.10% by weight, nitrogen 0.05% by weight, vanadium 2 ppm, nickel 13 ppm] was burned, and the combustion residue (carbon 86.8% by weight, vanadium 0.99% by weight, manganese 0.03% by weight, copper 0.01% by weight, lead 0.018% by weight, and further containing nickel, iron, silicon, magnesium, aluminum, calcium, sodium, titanium, and arsenic) remaining in the combustion furnace was collected in an amount of 2600 g (about 10 liters), and immersed in 6 liters (6400 g) of 10% by weight sulfuric acid for 6 hours at room temperature, followed by filtration to separate a green semi-transparent filtrate (containing 3500 ppm of tetravalent vanadium, 7400 ppm of iron, 3000 ppm of nickel, 70 ppm of manganese, 20 ppm of aluminum, 12 ppm of silicon, 5 ppm of lead, and 11 ppm of copper). To 1 liter of this filtrate was added 5.6 g of manganese dioxide, and the mixture was allowed to stand for 6 hours, after which the supernatant liquid was separated. Half the amount of manganese dioxide was recovered, and a catalyst solution containing 3500 ppm of pentavalent vanadium and 1900 ppm of divalent manganese was obtained as supernatant liquid. In 1 liter of this catalyst solution was dissolved sulfur dioxide to a concentration of 1550 ppm. The solution was shaken for 90 seconds at room temperature in air using a batchwise catalytic activity tester (a container with a stopcock having a capacity of 5 liters). The sulfur dioxide concentration in the catalyst solution decreased to below 2 ppm.

EXAMPLE 19

5050 g of a combustion residue (carbon 86.5% by weight, vanadium 3000 ppm, lead 100 ppm, manganese 200 ppm, copper 100 ppm) of a bottom oil [yield based on crude oil 24.7% by volume, specific gravity (20/4) 0.937, viscosity (98.9°C.) 125 cst, sulfur 0.18%, nitrogen 0.2%, vanadium 5 ppm, nickel 50 ppm] resulting from the distillation at reduced pressure of crude oil (occurring in Sumatra) was immersed in 20 liters of water for 2 days to form a green non-transparent aqueous solution (containing 410 ppm of tetravalent vanadium, 205 ppm of pentavalent vanadium, 120 ppm of nickel, 430 ppm of iron, 10 ppm of silicon, 4 ppm of aluminum, and 2.5 ppm of manganese). To 1 liter of this solution was added 0.35 g of manganese dioxide, and the mixture was shaken for 2 hours at room temperature to prepare a catalyst solution containing 605 ppm of pentavalent vanadium, and 222 ppm of divalent manganese. Sulfur dioxide was dissolved in this catalytic solution to a concentration of 350 ppm, and the solution was subjected to the same shaking test as in Example 18 for 90 seconds. It was found that the concentration of sulfur dioxide was reduced to below 2 ppm.

EXAMPLE 20

2300 g of soot (carbon 91% by weight, vanadium 3%, nickel 1.2%, iron 0.5%, manganese 0.26%) generated by the combustion of crude oil [occurring in Arabia, specific gravity (20/4) 0.851, sulfur 1.7%, nitrogen 0.09%, vanadium 13 ppm, nickel 4 ppm] was collected, and immersed in 8 liters of hot water at 70°C. for 1 hour, followed by filtration. Furthermore, the soot was washed with 7 liters of water, and filtered. The two filtrates were combined. Manganese dioxide (4.2g) was added to 1 liter of the combined filtrates (containing 180 ppm of pentavalent vanadium 3500 ppm of tetravalent vanadium, 920 ppm of nickel, 380 ppm of iron, 164 ppm of manganese, and 110 ppm of copper), and the mixture was shaken for 3 hours to form a transparent aqueous solution containing 3650 ppm of pentavalent vanadium and 2060 ppm of manganese, and the unreacted manganese dioxide. The mixture was filtered to recover 1.4 g of manganese dioxide, and sulfur dioxide was dissolved in the aqueous solution to a concentration of 535 ppm. The solution was subjected to the same activity test as in Example 18. It was found that after 80 seconds the concentration of sulfur dioxide was reduced to below 2 ppm.

EXAMPLE 21

2600 g of a combustion residue (carbon 86%, moisture 1%, vanadium 3%, iron 0.4%, nickel 0.8%, copper 360 ppm) of a bottom oil [yield based on crude oil 34% by volume, average molecular weight 890, carbon 83.9%, hydrogen 10.4%, sulfur 4.9%, nitrogen 0.34%, penetration (25°C.) more than 300, vanadium 140 ppm, nickel 45 ppm, sodium 42 ppm] resulting from the distillation at reduced pressure of crude oil [occurring in Khafji, specific gravity (20/4) 0.88, viscosity (50°C.) 12 cst, sulfur 3.0%, nitrogen 0.18%, vanadium 56 ppm, nickel 19 ppm] was collected, and immersed in 12 liters of 10% sulfuric acid for 2 hours, and filtered. It was further washed with 40 liters of water, and filtered. The two filtrates were combined. To 1 liter of the combined filtrates was added 2.5 g of manganese dioxide (soft manganese ore powder containing 90% of manganese dioxide), and the mixture was shaken for 2 hours, and filtered to recover half of the manganese dioxide, and form a catalyst solution containing 1300 ppm of pentavalent vanadium and 710 ppm of manganese. Sulfur dioxide was dissolved in the catalyst solution to a concentration of 1300 ppm, and the solution was subjected to the same activity test as in Example 18. It was found that the concentration of sulfur dioxide in the catalyst was decreased to below 2 ppm after 90 seconds.

EXAMPLE 22

3 Kg of a combustion residue (carbon 89%, vanadium 3.2%, nickel 0.8%) of a bottom oil [yield based on crude oil 55.5% by volume, specific gravity (20/4) 0.985, viscosity (50°C) 2000 cst, pour point 10°C., sulfur content 4.1%, nitrogen content 0.28%, n-heptane insoluble portion 6.9% by weight, vanadium 82 ppm, nickel 28 ppm] resulting from the distillation at atmospheric pressure of crude oil (occurring in Khafji, vanadium 64 ppm, nickel 19 ppm) was collected, and immersed in 18 liters of 20% sulfuric acid at 60°C. for 30 minutes, and filtered. It was further washed with 40 liters of water, and filtered. The two filtrates were combined, and 2.2 g of manganese dioxide was added to 1 liter of the combined filtrates (containing 5 ppm of pentavalent vanadium, 1274 ppm of tetravalent vanadium, and 31 ppm of manganese), and the mixture was filtered 12 hours later to recover half the amount of the manganese dioxide and to form a catalyst solution containing 1380 ppm of pentavalent vanadium and 705 ppm of manganese. Sulfur dioxide was dissolved in this catalyst solution to a concentration of 1430 ppm, and the solution was subjected to the same activity test as in Example 18. It was found that after 90 seconds, the concentration of sulfur dioxide was reduced to below 2 ppm.

EXAMPLE 23

160 Kg (about 420 liters) of a combustion residue (carbon 86.8% by weight, vanadium 1% by weight, manganese 0.025% by weight, copper 0.01% by weight) of a residual oil [yield 56.5% by volume, specific gravity (20/4) 0.900, viscosity (50°C.) 250 cst, pour point 50°C., sulfur 0.15% by weight, nitrogen 0.10% by weight, vanadium 3 ppm, nickel 30 ppm] resulting from the atmospheric pressure distillation of crude oil [occurring in Sumatra, specific gravity (20/4) 0.848, viscosity (50°C.) 10 cst, sulfur 0.10% by weight, nitrogen 0.05% by weight, vanadium 2 ppm, nickel 12 ppm] was immersed in 500 liters of water, and after 1 hour, the filtrate was separated. 100 liters of this filtrate (containing 230 ppm of pentavalent vanadium, 2480 ppm of tetravalent vanadium, 32 ppm of manganese) was collected, and 350 g of manganese dioxide was added. After allowing the mixture to stand for one day, it was filtered to recover half the amount of manganese dioxide and form a catalyst solution containing 2700 ppm of pentavalent vanadium and 250 ppm of manganese.

A gaseous mixture held at 200°C. and consisting of 2500 ppm of sulfur dioxide, 5% by volume of oxygen, 11% by volume of carbon dioxide and 9% by weight of moisture was fed to an absorption tower having an inside diameter of 2 inches and a height of 5 m and packed with Raschig rings at a rate of 2 N m$^3$/hr from its bottom. Simultaneously, the above catalyst solution (20°C.) was fed to the top of the absorption tower at a rate of 100 liters/hr. This resulted in the discharging of an absorbing liquid containing 140 ppm of sulfur dioxide from the bottom of the tower. The absorbing liquid was fed into the bottom of an oxidation tower having an inside diameter of 2 inches and a height of 65 cm and including 7 porous trays at a rate of 100 liters/hr. Furthermore, air was fed into it at a rate of 30 liters/hr. The effluent from the bottom of the oxidation tower was recycled as a sulfur dioxide absorbing liquid to be fed to the top of the absorption tower, and the unreacted air exhausted from the top of the oxidation tower was combined with the feed gas to be supplied to the bottom of the absorption tower. By these series of operation, the sulfur dioxide-containing gas was continuously desulfurized. It was found that the concentration of sulfur dioxide of the desulfurized gas exhausted from the absorption tower was 2 ppm initially, 34 ppm on the fourth day, and 90 to 100 ppm on the 10th day. But on the 15th day, it was still maintained at about 95 ppm. The concentration of sulfuric acid in the recycle liquid (catalyst solution) was 2% by weight on the 4th day, 5% by weight on the 10th day, and 11% by weight on the 20th day. However, the concentration of sulfur dioxide in the desulfurized gas was always maintained at below 100 ppm.

What we claim is:

1. In a process for removing sulfur dioxide from a gas stream containing the same prior to passing said gas stream to the ambient atmosphere by converting the sulfur dioxide in a low temperature, liquid phase, catalytic reaction to sulfuric acid, the improvement comprising contacting the sulfur dioxide containing gas stream and a gas containing oxygen with an acidic aqueous solution containing from 3 ppm to 8000 ppm of pentavalent vanadium ion and from 3 to 200 ppm of a divalent manganese ion at a temperature in the range of 0° to 100°C and continuing said contact until the concentration of sulfuric acid in said aqueous solution reaches up to 55% by weight.

2. The improved process of claim 1 wherein said aqueous solution contains 10 to 8,000 ppm of said pentavalent vanadium ion and 5 to 200 ppm of said divalent manganese ion.

3. The improved process of claim 2 wherein said oxygen containing gas is air and said contact is conducted at a temperature of 20° to 70°C.

4. The improved process of claim 1 wherein a single gas stream contains both of the sulfur dioxide and oxygen.

* * * * *